2,916,388
VITREOUS ENAMEL

John Alfred Earl, Alhambra, Calif., assignor to Consolidated Electrodynamics Corporation, Pasadena, Calif., a corporation of California No Drawing. Application August 26, 1957
Serial No. 680,432

5 Claims. (Cl. 106—49)

This invention relates to vitreous enamel and particularly to an inorganic vitreous enamel capable of bonding itself to metals, glasses and refractories.

In many industrial applications, there is need for a vitreous material capable of bonding itself to a metal, glass and other surfaces and possessing an ability to withstand high temperatures for an extended period of time. When used as an electrical insulator in connection with electrical instrumentation used under high temperature conditions, the material must in addition have the properties of high electrical resistivity and, in many uses, resistance to a corrosive environment. A material possessing these properties would enable the development of instrumentation to meet the increasingly more severe operating conditions under which an advancing technology requires such instrumentation to remain operable.

My invention comprises a vitreous enamel which combines the properties of high electrical resistance, temperature stability and temperature and corrosion resistance and, in addition, bonds itself to several metals including both the 300 and 400 series of stainless steels and Inconel. This vitreous enamel comprises a mixture of lead oxide, aluminum oxide, boron oxide, silicon oxide, a metallic oxide selected from the group consisting of oxides of barium, strontium, calcium, magnesium, cadmium and beryllium and a metallic oxide selected from the group consisting of oxides of cobalt, manganese, nickel and iron. I have also found that the superior properties of this vitreous enamel are adversely affected by the presence of any of the alkali metals in the composition. My invention also encompasses the method by which the enamel is compounded. The method comprises mixing in dry form oxides and oxidizable compounds of lead, barium, cobalt, aluminum, boron and silicon, heating the mixture until the mass becomes liquid and grinding the fused product to a fine powder.

The enamel is preferably composed of about 44% by weight lead oxide, about 16% by weight barium oxide, about 3% by weight cobalt oxide, about 2% by weight aluminum oxide, about 8% by weight boric oxide, and about 27% by weight silicon dioxide. Without destroying the basic value of this enamel, certain of its properties may be changed by varying the composition within the following ranges:

| Ingredient: | Percent by weight |
|---|---|
| PbO | 35–55 |
| BaO | 10–20 |
| CoO | 2–10 |
| $Al_2O_3$ | 1–5 |
| $B_2O_3$ | 6–10 |
| $SiO_2$ | 20–40 |

In addition, the oxides of strontium, calcium, magnesium, cadmium and beryllium may be substituted for the barium oxide in equivalent amounts. Similarly, the oxides of manganese, nickel and iron may be substituted in equivalent amounts for cobalt oxide. While such substitution would not be deleterious to the basic value of the enamel, individual physical characteristics of the enamel would be affected. Accordingly the use of barium oxide and cobalt oxide is preferred.

The composition described above represents the composition of the final product of the invention. To prepare this coating it is possible to mix various ingredients which will upon decomposition or by chemical reaction induced by elevated temperatures yield a final enamel product of the desired composition. I have found that a mixture of red lead oxide, commonly known as red lead, barium carbonate, cobalt oxide, calcined aluminum oxide, commonly known as alumina, boric acid and flint, a compound containing about 98% silicon dioxide, is a preferred initial mixture. For example, barium carbonate is used as the source of barium oxide since barium carbonate is less toxic than barium oxide. In addition, the evolution of carbon dioxide upon decomposition of barium carbonate agitates the mixture during fusion of the ingredients and thereby is helpful in imparting homogeneity to the final product. Similarly, boric acid is used initially instead of boron oxide since the latter compound deliquesces making quantitative additions difficult. However, various other compounds may be substituted as a source of the elements required for the final composition. For example, lead monoxide, commonly known as litharge, may be used in the place of red lead. Lead silicate or lead borosilicate may be used as a source of the required lead and silica or the required lead, boron and silica respectively. Other compounds may be substituted as ingredients of the initial mixture so long as they are combined initially in such proportions as to give the final composition within the range that I have described.

The preferred initial mixture of red lead, barium carbonate, cobalt oxide, aluminum oxide, boric acid and flint is compounded in the following proportions:

| Ingredient: | Percent by weight |
|---|---|
| $Pb_3O_4$ | 40 |
| $BaCO_3$ | 18 |
| CoO | 3 |
| $Al_2O_3$ | 2 |
| $H_3BO_3$ | 13 |
| $SiO_2$ | 24 |

These ingredients are mixed dry and ground to form an intimate mixture. The mixture is placed in a refractory crucible and heated in a furnace until the mass becomes liquid. I have found a temperature of 2000° F. to be satisfactory for the preferred mixture, although the proper temperature varies with the particular composition employed. The time for heating should be sufficient to permit uniform heating of the entire mass and to permit evolution of the various gaseous reaction products from the mixture. The preferred period of time for heating of the ingredients is about one hour. Upon completion of the heating, the liquid is quenched by pouring into water at room temperature. The quenching produces a granular frit. The frit is then ground in a ball mill to produce a powder. The extent to which the product is ground in the ball mill is dependent upon the particular application to which the vitreous product will be put. For example, where the vitreous product is to be used as a coating for a metallic surface, the product is ground so that the powder passes through a 400 mesh screen. On the other hand, where the vitreous product is to be molded into a part such as a high-temperature bushing, a coarser powder may be employed.

To use the vitreous product as a coating for metallic or other surfaces, one method for such application is to mill the powdered vitreous product with water to produce a fine paste. This paste is applied to the surface to be treated by brushing, dipping or spraying. After application, the coated part is fired until a fused enamel coating is bonded to the metal surface. I have found that the time and temperature of firing vary with both the nature of the surface to be coated and the composition of the enamel coating. For example, an enamel coating of my preferred composition is vitrified on stainless steels of the 400 series by firing at a temperature of approximately 1400° F. for about five minutes. On a metal such as Inconel, firing at a temperature of approximately 1800° F. for about five minutes is required. Both the fusion time and fusion temperature for coating of a particular surface with an enamel of a particular composition may be readily determined.

The following electrical and physical properties of the vitreous enamel are illustrative to define the exceptionally useful characteristics of the enamel.

Young's modulus—$7.8 \times 10^6$ lbs./sq. in.
Maximum safe operating temperature—1100° F.
Thermal coefficient of expansion:
 Between 70° F. and 870° F.—$5.0 \times 10^{-6}$ inch/inch/° F.
 Between 70° F. and 900° F.—$5.3 \times 10^{-6}$ inch/inch/° F.
Electrical resistivity:
 Between 70° F. and 300° F.—$7.6 \times 10^{12}$ ohm-cms.
 Between 70° F. and 600° F.—$2.3 \times 10^{11}$ ohm-cms.
 Between 70° F. and 1200° F.—$7.6 \times 10^6$ ohm-cms.
Breakdown voltage—300 volts/mil (based on a 2 mil coating)

The following tests are illustrative of the ability of the vitreous enamel to withstand severe environmental conditions and of its adaptability to high-temperature instrumentation, particularly where rapid fluctuations in temperature occur.

As an example of the excellent temperature stability of the enamel and of its ability to withstand thermal shock, a metal part coated with the enamel was heated to 700° F. and then immediately immersed in water at a temperature of 70° F. The coated part was also heated to 1200° F. and chilled to bring it to a room temperature of about 70° F. No cracking of the coating occurred as a result of these tests and the bond between the metal surface and the coating was not affected in any way.

As an example of the excellent temperature resistance of the enamel, a high temperature bushing made of the enamel and bonded to a metal pin passing through the center of the bushing was heated to a temperature of 1200° F. and maintained at that temperature for three hours. The pin remained upright without slumping at this temperature, indicating that no softening sufficient to affect the mechanical strength of the enamel occurred.

The unusual properties which are combined in the vitreous enamel of this invention make it readily adaptable to uses involving severe operating conditions. Its ability to form a non-porous resistant coating of high dielectric strength on a variety of metals makes it unique among coatings of ceramic composition. Its properties of high dielectric strength and temperature resistance and stability enable its use to fashion bushings, ceramic tubes and other parts requiring leak-proof bonding to inserts of metal, glass and refractories.

I claim:

1. A vitreous enamel which by weight consists essentially of from about 35% to about 55% lead oxide, from about 10% to about 20% of a metallic oxide selected from the group consisting of oxides of barium, strontium, calcium, magnesium, cadmium and beryllium, from about 2% to about 10% of a metallic oxide selected from the group consisting of oxides of cobalt, manganese, nickel and iron, from about 1% to about 5% aluminum oxide, from about 6% to about 10% boron oxide, and from about 20% to about 40% silicon dioxide.

2. A vitreous enamel which consists essentially of a mixture proportioned by weight as follows: 44% lead oxide, about 16% of a metallic oxide selected from the group consisting of oxides of barium, strontium, calcium, magnesium, cadmium and beryllium, about 3% of a metallic oxide selected from the group consisting of oxides of cobalt, manganese, nickel and iron, about 2% aluminum oxide, about 8% boron oxide and about 27% silicon dioxide.

3. A vitreous enamel which by weight consists essentially of from about 35% to about 55% lead oxide, from about 10% to about 20% barium oxide, from about 2% to about 10% cobalt oxide, from about 1% to about 5% aluminum oxide, from about 6% to about 10% boron oxide, and from about 20% to about 40% silicon dioxide.

4. A vitreous enamel which consists essentially of a mixture proportioned by weight as follows: about 44% lead oxide, about 16% barium oxide, about 3% cobalt oxide, about 2% aluminum oxide, about 8% boron oxide and about 27% silicon dioxide.

5. A vitreous enamel made from a mixture of red lead, barium carbonate, aluminum oxide, boric acid and flint, these ingredients being proportioned by weight as follows: about 40% red lead, about 18% barium carbonate, about 3% cobalt oxide, about 2% aluminum oxide, about 13% boric acid and about 24% flint.

References Cited in the file of this patent

UNITED STATES PATENTS

| | | |
|---|---|---|
| 2,351,252 | Deyrup | June 13, 1944 |
| 2,425,032 | Deyrup | Aug. 5, 1947 |

FOREIGN PATENTS

| | | |
|---|---|---|
| 531,146 | Great Britain | Dec. 30, 1940 |
| 665,880 | Great Britain | Jan. 30, 1952 |